Figure 1:
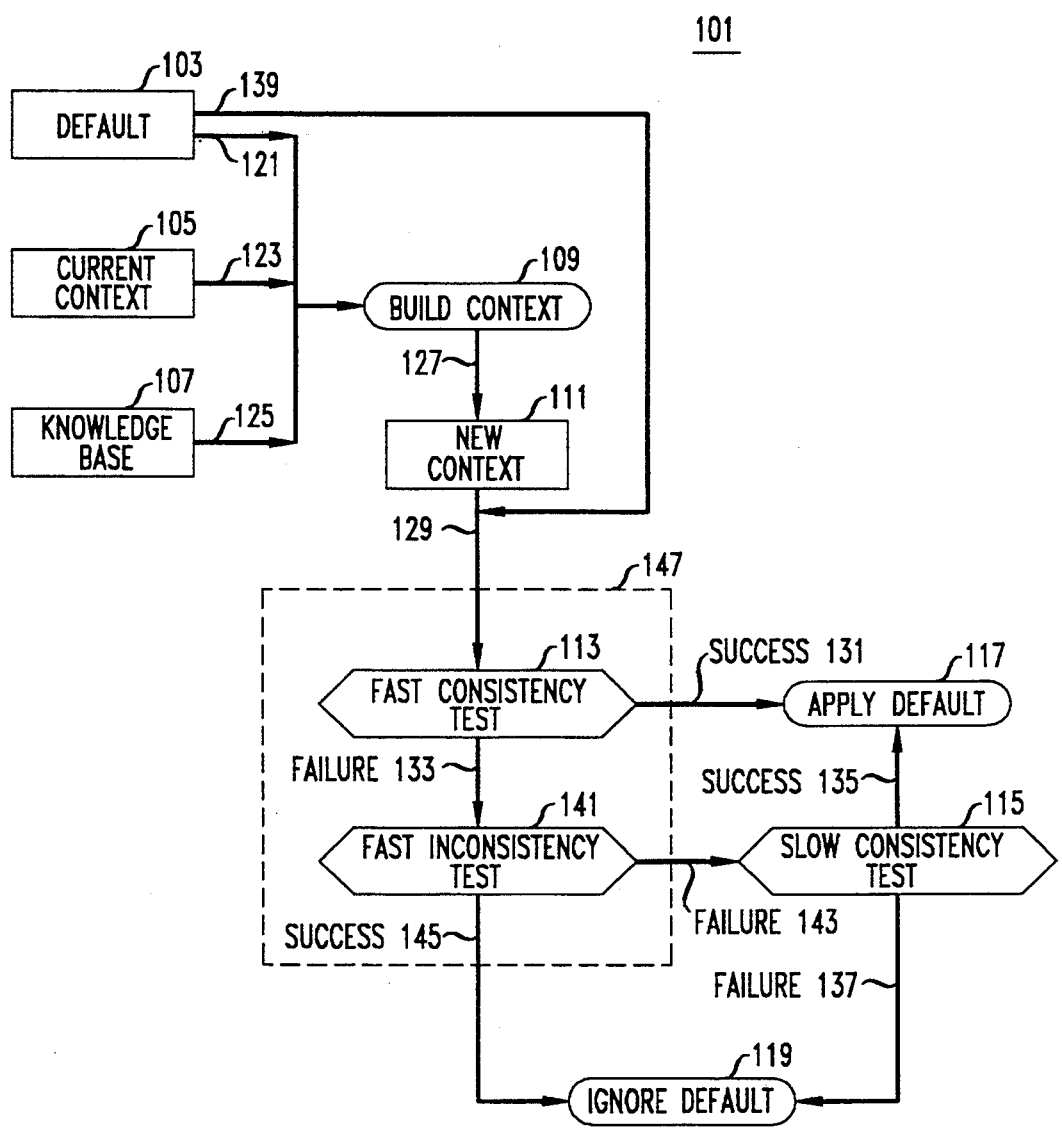

United States Patent
Crawford, Jr. et al.

[11] Patent Number: 5,446,830
[45] Date of Patent: Aug. 29, 1995

[54] EFFICIENT NONMONOTONIC REASONING APPARATUS AND METHODS

[75] Inventors: James M. Crawford, Jr., Stirling; David W. Etherington, Fanwood, both of N.J.

[73] Assignee: AT&T Corp., Murray Hill, N.J.

[21] Appl. No.: 236,708

[22] Filed: May 2, 1994

Related U.S. Application Data

[63] Continuation of Ser. No. 889,692, May 27, 1992, abandoned.

[51] Int. Cl.⁶ .............................................. G06F 9/44
[52] U.S. Cl. ...................................... 395/51; 395/55; 395/75; 395/76; 395/77
[58] Field of Search ...................... 395/51, 55, 75, 76, 395/77

[56] References Cited

U.S. PATENT DOCUMENTS 4,675,829  6/1987  Clemenson ........................... 395/65
5,167,012  11/1992  Hayes et al. ......................... 395/76

OTHER PUBLICATIONS

Elgot-Drapkin, et al, Proceedings Of The 1987 Workshop On The Frame Problem In Artificial Intelligence, "Life on a Desert Island: Ongoing Work on Real-Time Reasoning", pp. 349-357 (1987), Lawrence, Ks.
D. Perlis, Proceedings of the First International Workshop on Monmonotonic Reasoning, "Nomonotonicity and Real-Time Reasoning", pp. 363-372, (1984) New Paltz, N.Y.
Etherington, et al, International Journal of Expert Systems Research and Applications, "Limited Scope and Circumscriptive Reasoning", pp. 207-217, vol. 3, No. 3 (1990), USA.

*Primary Examiner*—Allen R. MacDonald
*Assistant Examiner*—Richemond Dorvil
*Attorney, Agent, or Firm*—Gordon E. Nelson

[57] ABSTRACT

The use of nonmonotonic or "common sense" reasoning has often been advocated to speed up reasoning systems. The difficulty has always been that nonmonotonic reasoning requires consistency checks, which are even more computationally intractable than the monotonic reasoning normally used in reasoning systems. Disclosed herein are methods and apparatus for making consistency checks tractable by performing them over a limited context using fast sufficient consistency checks. The results are approximate, but approximate results are expected in nonmonotonic reasoning. Included in the disclosure are techniques for selecting the limited context and making the fast sufficient consistency checks and a default reasoner which employs the techniques to check the consistency of a default conclusion with a limited context.

20 Claims, 1 Drawing Sheet

EFFICIENT NONMONOTONIC REASONING APPARATUS AND METHODS

This application is a continuation of application Ser. No. 07/889,692, filed May 27, 1992, now abandoned.

1 BACKGROUND OF THE INVENTION

1.1 Field of the Invention

The invention pertains to artificial intelligence systems generally and more specifically to artificial intelligence systems that perform inference in the context of large knowledge bases. In this context, a theory is a set of logical formulas which represent knowledge about a problem of interest. Given a theory, an artificial intelligence system can make new inferences for a user of the system. The user may be an individual or another system, and is termed herein an agent.

1.2 Description of the Prior Art

Generally speaking, the formulas in a knowledge base are written in predicate calculus. Such formulas may con,in logical quantifiers such as "there exists" $\exists$, or "for all" $\forall$, logical operators such as "and" $\wedge$, "or" $\vee$, "implies" $\supset$, or "not" $\neg$, "predicates", which express properties of individuals or objects, variables, which represent individuals or objects in the world without explicitly naming them, constants, which are explicit names for individuals or objects, and functions which allow reference to individuals or objects in terms of others. A term is a variable, a constant, or the application of a function to another term; a ground term is a term with no variables. A quantified formula is a formula containing a first-order quantifier ($\forall$ or $\exists$). A rule is a formula containing one or more variables whose top-level connective is $\supset$. The antecedent and consequent of a rule are defined in the obvious way. A fact is a formula containing neither quantifiers nor variables.) For details of predicate calculus see (Genesereth, M. R., and Nilsson, N. J. Logical Foundations of Artificial Intelligence. Morgan Kaufman. 1987.).

Traditional predicate calculus is monotonic—if a set of formulas Th in predicate calculus implies a conclusion c then any superset Th' of Th also implies c. In practical terms, this means that a conclusion, once made, will never have to be revised as a consequence of further reasoning.

Unfortunately, many of the types of reasoning required in advanced applications of artificial intelligence have aspects that are inherently not monotonic. Nonmonotonic logics do not have the property that a conclusion will never have to be revised—in such logics it may be the case that Th implies c but a superset, Th', does not imply c. Nonmonotonic logics thus have some of the properties of human common-sense reasoning: that is, a reasonable conclusion is made based on the information and inferences presently available, and that conclusion is revised if further information or further deliberation about the problem indicate that revision is required. For a general overview of monotonic and nonmonotonic logic and their use in artificial intelligence see (Genesereth, M. R., and Nilsson, N. J. Logical Foundations of Artificial Intelligence. Morgan Kaufman. 1987.).

In general, nonmonotonic formalisms sanction default conclusions only if certain formulae can be shown to be consistent with the rest of the system's beliefs. (In logic a formula is consistent with a set of beliefs if there is some possible state of the world (a model) in which both the theory and the set of beliefs are true.) For example, in default logic the justification of a default must be shown to be consistent with all other beliefs before the consequent is sanctioned; similarly, in closed-world reasoning, $\neg$ P can be assumed only if P does not follow. Unfortunately, in the worst case, consistency is even harder to determine than logical consequence. While the theorems of a first-order theory are recursively enumerable, there can be no effective procedure to determine first-order consistency. In most cases, the unacceptable time complexity of nonmonotonic formalisms can be traced to this consistency check.

It is striking how much early work on nonmonotonic reasoning was motivated by the idea that defaults should make reasoning easier. For example, Reiter (Reiter, R. 1978. On reasoning by default. In *Proceedings of the Second Conference on Theoretical Issues in Natural Language Processing*, Urbana, Ill. 210–218.) says "[the closed-world default] leads to a significant reduction in the complexity of both the representation and processing of knowledge". Winograd (Winograd, T. 1980. Extended inference modes in reasoning by computer systems. *Artificial Intelligence* 13:5–26.) observes that the nature of the world is such that mechanisms for making assumptions are necessary for an agent to act in real time: "A robot with common sense would begin an automobile trip by walking to the place where it expects the car to be, rather than sitting immobilized, thinking about the infinite variety of ways in which circumstances may have conspired for it not to be there. From a formal point of view, there is no way to prove that it is still there, but nevertheless one must act, and must do so on the basis of plausible assumptions."

Paradoxically, formal theories of nonmonotonic reasoning have been consistently characterized by their intractability. For example, first-order default logic (Reiter, R. 1980. A logic for default reasoning. *Artificial Intelligence* 13:81–132.) is not semi-decidable and its rules of inference are not effective—it might take forever (not just a very long time) to determine that something is a consequence of a default theory. Even very restricted sublanguages based on propositional languages with linear decision procedures remain NP-complete (Kautz, H. and Selman, B. 1989. Hard problems for simple default logics. In *Proceedings, First International Conference on Principles of Knowledge Representation and Reasoning*, Toronto, Canada. Morgan Kaufmann.). Convincing examples of useful theories within demonstrably tractable sublanguages for nonmonotonic reasoning have yet to appear. It is an object of the techniques disclosed herein to provide solutions to these and other problems involved in the use of nonmonotonic reasoning in artificial intelligence systems and thereby to provide more efficient artificial intelligence systems.

2 SUMMARY OF THE INVENTION

In one aspect, the solution is a method employed in a reasoning system that includes a knowledge base of rules and facts to approximately determine whether a given fact about one or more objects is consistent with the knowledge base, the method comprising the steps of:

- obtaining a context made up of a subset of the rules and facts;
- determining a consistency relationship between the given fact and the context by means of a sufficient test; and treating the given fact as consistent with the knowledge base if the sufficient test so indicates.

In another aspect, the solution is an apparatus that carries out the foregoing method.

The advantage of these techniques and apparatus is that they perform fast, incomplete consistency checks on limited contexts. Useful default conclusions can thus be rapidly drawn and the reasoning process can thereby be made significantly faster. The default conclusions reached by this technique are applied in the same fashion in which defaults are applied in common-sense reasoning: the default is applied unless its inapplicability is readily apparent (i.e., "at the top of your mind"). Our approach trades accuracy for speed: "inappropriate" conclusions may be reached that must be retracted solely due to additional thought. However, this tradeoff is in accord with the original arguments for default reasoning. More importantly, defaults appear generally to be used in ways that minimize the cost of this tradeoff.

The foregoing and other objects and advantages of the invention will be understood by those of ordinary skill in/the art upon consideration of the following Detailed Description and Drawing.

3 BRIEF DESCRIPTION OF DRAWING

FIG. 1 is a schematic diagram of an embodiment of the invention.

4 DETAILED DESCRIPTION OF THE INVENTION

The following Detailed Description will first discuss restricting the scope of consistency checking, will then describe an application of the invention to default logic as proposed by Reiter, will next discuss fast consistency checks, and will finally present an implementation of a default reasoner which employs the techniques of the invention. LISP code for the implementation is contained in Appendix A.

4.1 Restricting the Scope of Consistency Checking

The idea of restricting the scope of consistency checking to a subset of the knowledge base is not new. It seems to be a logical result of a long tradition of context-limited reasoning in AI systems dating back to CONNIVER (c.f. McDermott, D. V. and Sussman, G. J. 1972. The CONNIVER reference manual. Technical Report AI Memo 259, MIT Artificial Intelligence Laboratory. Fahlman, S. E. 1979. *NETL: a System for Representing and Using Real-World Knowledge.* MIT Press. McDermott, D. 1982. Contexts and data-dependencies: A synthesis. Technical report, Department of Computer Science, Yale University. ). This line of work limits deductive effort, resulting in incompleteness. Limiting the range of consistency checking in default reasoning, however, results in unsoundness-unwarranted conclusions may be reached due to lack of deliberation. However, this line of research contains many ideas on more sophisticated mechanisms for delineating contexts that can obviously be incorporated into more sophisticated implementations of the invention.

More directly related to the work presented here is Perils' suggestion to limit the consistency check to a set of about 7 formulae determined by immediate experience. Perlis argues that anything more is too expensive (Perlis, D. 1984. Nonmonotonicity and real-time reasoning. In *Proceedings of the First International Workshop on Nonmonotonic Reasoning,* New Paltz, N.Y. Elgot-Drapkin, J.; Miller, M.; and Perlis, D. 1987. Life on a desert island: Ongoing work on real-time reasoning. In *Proceedings of the 1987 Workshop on the Frame Problem in Artificial Intelligence,* Lawrence, Kans. 349–357.). He suggests that agents will simply have to adopt default conclusions and retract them later when further reasoning reveals contradictions. There are problems with Perlis' approach, however. First of all, consistency-checking can be undecidable even in such tiny theories. More importantly, though, the errors this approach produces do not seem justifiable, since defaults are applied with essentially no reflection. Our analysis can be seen as explaining why (and when) such context-limited consistency checking can be expected to have a high probability of correctness. Furthermore, we believe that the novel notion of combining the application of fast consistency tests with limited contexts provides significant leverage, including allowing contexts to be larger (thus improving accuracy) while still achieving tractability.

The THEORIST system (Poole, D.; Goebel, R. G.; and Aleliunas, R. 1987. Theorist: a logical reasoning system for defaults and diagnosis. In Cercone, N. and McCalla, G., editors 1987, *The Knowledge Frontier: essays in the representation of knowledge,* New York. Springer Verlag. 332–352. Poole, D. 1989. Explanation and prediction: An architecture for default reasoning. *Computational Intelligence* 5(2):97–110.) is also related in that it uses limited consistency checking to determine default applicability. However, THEORIST does not maintain a notion of context, so its errors are based on the use of incomplete reasoning mechanisms, rather than a restricted focus of attention. Also, THEORIST has no notion of fast, sufficient, consistency checking.

4.2 Default Logic

The combination of limited contexts with fast sufficient consistency checking may be employed in many kinds of nonmonotonic reasoning. One important kind of nonmonotonic reasoning is Reiter's Default Logic (Reiter, R. 1980. A logic for default reasoning. *Artificial Intelligence* 13:81–132.), and in the following, we disclose how our techniques may be employed to make a reasoner which reasons according to Reiter's default logic.

A default has the form:

$$\frac{Prereq(\bar{x}){:}Just(x)}{Conseq(\bar{x})}, \qquad (1)$$

where Prereq, Just, and Conseq are formulae whose free variables are among $\bar{x}=x_1, \ldots, x_n$; they are called the prerequisite, justification, and consequent of the default, respectively. The default can be read as saying that if Prereq is known in or implied by a knowledge base, and Just is consistent with the knowledge base, then Conseq should be believed: informally, this says that anything satisfying Prereq typically satisfies Conseq unless it is known not to satisfy Just.

4.3 Fast Sufficient Tests for Consistency

Efficient nonmonotonic reasoning might be achieved in two ways: by skipping the consistency check, or by doing it quickly. Ginsberg proposes skipping it in situations where defaults can be used as heuristics to produce a proposed solution that can be quickly verified, and where the expected savings from the heuristic use of defaults outweigh the cost of having to discard the proposed solution when this verification fails. (Ginsberg, M. L. 1991. The computational value of nonmonotonic reasoning. In *Proceedings, Second International Conference on Principles of Knowledge Representation and Reasoning*, Cambridge, Mass. Morgan Kaufmann.) Ginsberg's approach is, however, not appropriate in many applications of default reasoning, because the verification of their solutions again entails consistency checking.

Thus, Ginsberg's approach notwithstanding, the problem is making the consistency check faster. Unfortunately, consistency checks which are both fast and guaranteed to be correct can only be done correctly in restricted sublanguages, and the usefulness of such sublanguages has not yet been demonstrated.

There remains one potential avenue of escape: the intractability of checking consistency is only a worst-case result. There are fast sufficient tests for consistency. A sufficient consistency test is one whose success implies consistency, but whose failure does not necessarily provide any information. The time complexity of some of these tests is no worse than linear in the size of the knowledge base.

For example, consider a ground instance, $$\frac{\alpha:\beta}{\beta},$$

of a default. In order to conclude $\beta$ from a theory containing $\alpha$, it must first be established that $\beta$ is consistent with the theory. So long as the theory and $\beta$ are each self-consistent, it suffices (but is not necessary) that none of the predicates in the clausal representation of $\beta$ occur with opposite sign in the clausal representation of the theory. This can be determined in linear time (generally less if the theory is indexed), even for non-clausal theories. (For a discussion of clausal form see (Genesereth, M. R., and Nilsson, N. J. Logical Foundations of Artificial Intelligence. Morgan Kaufman. 1987. pp. 63–66).)

Similarly, if the theory and $\beta$ are definite (each clause contains exactly one positive literal), then $\beta$ is consistent with the theory. Testing definiteness for a new $\beta$ is independent of the size of the theory and depends only on $\beta$ (provided that the definiteness of the theory is maintained as the theory evolves).

Another sufficient condition applies for Horn theories. A formula is said to be Horn if, when put in clausal form, it contains at most one positive literal. A theory is said to be Horn if all its formulae are Horn. For such theories, consistency with a given ground literal is implied if all ground literals in the theory are of the same sign (either positive or negative) as the given ground literal. (Literals are positive or negative applications of predicates to terms. A literal is ground if it contains no variables.)

A slightly more complicated test derives from the techniques of Borgida and Etherington (Borgida, A. and Etherington, D. W. 1989. Hierarchical knowledge bases and tractable disjunction. In *Proceedings, First International Conference on Principles of Knowledge Representation and Reasoning*, Toronto, Canada. Morgan Kaufmann. 33–43.), which can be used to quickly provide upper-bound checks that will succeed only if (but not necessarily if) consistency obtains (provided the system's knowledge about the world is structured hierarchically). This idea can be generalized to other notions of upper-bound checks such as those described by Dalal and Etherington (Dalal, M. and Etherington, D. W. 1992. Tractable approximate deduction using limited vocabularies. In *Proceedings, Ninth Canadian Conference on Artificial Intelligence*, Vancouver, Canada. Canadian Society for Computational Studies of Intelligence. 206–212.)

There are many other fast sufficient tests for consistency, but the foregoing suffice to illustrate our proposal for efficient default reasoning.

There is one obstacle to using fast consistency tests: in realistic applications such tests can be reasonably expected to fail. (This may explain why they have not heretofore been widely touted as eliminating intractability.) It would be a peculiar knowledge base that, for example, had the default "Birds usually fly", $$\frac{Bird(x):Flies(x)}{Flies(x)},$$

without any information about birds that don't fly! The very use of a default seems to presume knowledge (or at least the strong expectation) of exceptions. Hence, when the time comes to test the consistency of Flies(Tweety), we can count on the presence of rules like $\forall x. Penguin(x) \supset \neg Flies(x)$. This will cause the tests described above to fail, giving us no useful information.

The dual notion of fast sufficient tests for inconsistency can also be applied to quickly determine that a formula is inconsistent with the context in some cases, allowing the default to be quickly ignored.

4.4 Combining Limited Contexts with Fast Consistency Tests

Notice, however, that in commonsense reasoning one is almost always completely unconscious of this or of the many other ways a bird might be shown not to fly. It seems plausible, then, that one might be able to restrict the system's "focus of attention" to a subset of the knowledge base (a context) in such a way that it is likely that the fast consistency checks succeed. This combination of limited contexts and fast consistency checking is the essence of our proposal for fast default reasoning. By combining the two techniques, we overcome the limitations of either technique by itself and achieve a synergy between the two. The context restriction allows fast tests to be productive and fast tests allow consistency to be checked in reasonable time. The combination thus allows high expected efficiency despite the necessity of consistency checking.

To be sure, our technique is an approximation technique and like all such techniques, trades correctness for speed. However, as we show in detail below, the nature of default reasoning makes this trade relatively inexpensive and intuitively plausible.

FIG. 1 provides a general overview of a default reasoner 101 which is constructed using our techniques. Context builder 109 builds a new context 111 using an algorithm which employs default 103, the current context 105, and information from knowledge base 107, as indicated by arrows 121, 123, and 125. Fast consistency checker 113 then employs a fast sufficient consistency test to determine whether the justification of default 103 is consistent with new context 111, as shown by arrows 129 and 139. If the fast sufficient consistency test is successful, as indicated by success arrow 131, the default is applied, as shown at 117. How it is applied will of course depend on the agent; for example, the default may be used to make further inferences.

If the fast sufficient consistency test fails (as pointed out above, the failure may or may not mean that the justification of default 103 is inconsistent with the new context 111), fast inconsistency checker 141 employs one of the known fast sufficient inconsistency checks to determine whether the justification of the default is inconsistent with new context 111. If the fast inconsistency test succeeds, the default is ignored, as indicated by success arrow 145 and "ignore default" 119. Otherwise, slow consistency checker 115 employs one of the known slow consistency checks to determine whether the justification of the default is consistent with new context 111. If that check shows that the justification is inconsistent, the default is ignored, as may be seen from failure arrow 137 and "ignore default" 119. Otherwise, the default is applied as described above, as shown by success arrow 135 and "apply default" 117. As is apparent from the foregoing, if the fast sufficient consistency relationship determination 147 succeeds, default reasoner 101 is much faster than prior-art default reasoners that do not employ limited contexts; if it fails, default reasoner 101 is slower than prior-art default reasoners by no more than the time it takes fast consistency tester 147 to perform the fast sufficient consistency relationship tests. It is also apparent that this approach provides much better accuracy then prior-art default reasoners that do employ limited contexts.

Of course, default reasoner 101 is bound to produce errors; however, as pointed out above, so will any efficient default reasoner. Are the errors produced by reasoner 101 reasonable? From section 4.8 it is clear that no categorical statement to this effect can be given for all theories. It is also clear that the quality of the results will ultimately depend on the appropriateness of the context-selection mechanism (or, equivalently, the reasonableness of the defaults—see section 4.6).

This being said, we can make several arguments in favor of our approach. First, as argued in section 4.6, the nature of the default reasoning task minimizes the impact of the loss of correctness while maximizing the gain in efficiency. Second, the kinds of errors induced by approximate consistency checking are intuitively plausible. People, lacking the ability to know all the logical consequences of their beliefs, frequently apply defaults that are inappropriate given all they "know". For example, many of us can recall driving our default route between two points only to recall—on encountering a major traffic jam—having heard that the road would be under construction. Such examples seem to indicate that human default reasoning does take place in a limited context that does not include everything we know. As people temporarily "forget" about exceptions—making them inaccessible in the current context—so our approach will sometimes make inappropriate assumptions. Third, 5 we achieve what has been described elsewhere (Borgida, A. and Etherington, D. W. 1989. Hierarchical knowledge bases and tractable disjunction. In *Proceedings, First International Conference on Principles of Knowledge Representation and Reasoning*, Toronto, Canada. Morgan Kaufmann. 33–43.) as "asymptotic correctness", in the sense that if the agent has time to retrieve more formulae and reason with them, the probability of correctness (measured, for example, against the specification of standard default logic) increases. Thus, we can achieve a favorable trade of correctness for efficiency, without abandoning the semantic foundation provided by nonmonotonic logic.

The obvious danger implicit in our approach is that one will occasionally arrive at default conclusions that are inconsistent with what is already known. Any system based on these ideas must clearly be alert to the possibility of inconsistency, must be prepared to arbitrate among and retract contradictory facts, and must not allow an inconsistent knowledge base to license all conclusions. Elsewhere (Etherington, D. W. and Crawford, J. M. 1992. On contexts and tractability in default logic. In preparation.), we argue at length, as do Elgot-Drapkin et al (Elgot-Drapkin, J.; Miller, M.; and Perils, D. 1987. Life on a desert island: Ongoing work on real-time reasoning. In *Proceedings of the 1987 Workshop on the Frame Problem in Artificial Intelligence*, Lawrence, Kans. 349–357.) and many others, that this is not a particular hardship for a default reasoner. In particular, the very nature of default reasoning entails that it will be possible for the system to make inferences that are consistent with all it knows, yet inconsistent with the state of the world. Such systems must be able to deal with the discovery of information that contradicts their default conclusions. Our approach admits the possibility that a contradiction may be detected purely as the result of further reasoning, rather than as the result of new observations; logically, the situation and the required responses are the same.

4.5 A Simple Definition of Context

Practical context selection seems to necessarily involve a balance between the cost of determining the context and the loss of accuracy from limiting consistency checking to the context. We now sketch one possible context-selection mechanism (among many). We then argue that the nature of defaults makes the particular details of the context selection mechanism less critical than one might expect.

Consider an agent with a large knowledge-base of facts and quantified formulae. The notion of context we have in mind corresponds to the commonsense idea of the agent's current focus of attention, and is partly determined by the agent's recent history. In particular, information comes into the context as they are attended to (e.g., from perception, reasoning, or memory), and exits as it becomes stale (or is squeezed out). The context should include any facts known about the object under discussion. For example, if the object is Tweety and Tweety is known to be a penguin, then the context should include Penguin(Tweety). Further, the context should contain any rule whose antecedent and consequent have some literal instantiated in either the context or the negation of the justification to be checked. (Rules whose antecedents are empty—i.e., logically true—are treated as though their antecedents were instantiated in any context.) For instance, if Penguin(Tweety) is in the context, and the agent is checking the consistency of Flies(Tweety) with the context, the context should also include $\forall x. \text{Penguin}(x) \supset \neg \text{Flies}(x))$. Similar notions of an agent's context may be found in Elgot-Drapkin et al (Elgot-Drapkin, J.; Miller, M.; and Perlis, D. 1987. Life on a desert island: Ongoing work on real-time reasoning. In *Proceedings of the 1987 Workshop on the Frame Problem in Artificial Intelligence*, Lawrence, Kans. 349–357.). If the knowledge base is well indexed and good hash coding is used to speed access, it is possible to compute such a context quickly (one could also use a parallel algorithm such as spreading activation). The size of the context will be limited because the set of facts about a given object in the knowledge base is generally much smaller than the set of all facts in the knowledge-base, and the same is true of the set of rules whose antecedent and consequent are instantiated relative to the set of all rules in the knowledge-base.

There are many ways of elaborating this simple notion of context. Limited forms of rule chaining can be provided in cases where chaining can be tightly bounded by the structure of the represented knowledge. For example, if the knowledge base has a terminological component (e.g., KL-ONE (Brachman, R. J. and Schmolze, J. 1985. An overview of the KL-ONE knowledge representation system. *Cognitive Science* 9(2):171–216.) and similar languages), chains through the terminological hierarchy might be brought into the context by treating any deduction from terminological knowledge as a single 'rule' application. One could also retrieve "obvious" related items for the context using Crawford's notion of the accessible portion of the knowledge-base (Crawford, J. M. 1990. *Access-Limited Logic—A Language for Knowledge Representation.* Ph.D. Dissertation, University of Texas at Austin, Austin, Tex.), Levesque's notion of limited inference (Levesque, H. J. 1984. A logic for implicit and explicit belief. Technical Report FLAIR TR 32, Fairchild Laboratory for Artificial Intelligence Research.), or other mechanisms that guarantee small computational costs for retrieval.

4.6 The Mitigating Nature of Defaults

The difficulty in context selection is finding a context that, on the one hand, provides the basis for a meaningful consistency check and, on the other hand, is small enough to permit quick computation. Clearly, this is a hard problem, and here we have described only a very rudimentary mechanism to do it. Fortunately, the nature of defaults makes selection of a useful context less difficult than might be expected.

For a default to be reasonable, (at least) two factors must combine favorably. These are: (1) the likelihood that the consequent holds given that the prerequisite holds and, (2) the likelihood that if the prerequisite holds but the justifications are not consistent (causing the default to be inapplicable), then the agent will be aware of this fact. If the default is extremely likely to apply, one can tolerate the fact that one may overlook the odd exception. Similarly, if exceptions are easy to spot, it may be useful to have a default that rarely applies. However, if exceptions are common but difficult to detect, one is ill-advised to rely on defaults.

Another mitigating factor is the way that defaults are used. For example, when using defaults with respect to communicated information, Gricean principles of cooperative conversation (Grice, H. P. 1975. Logic and conversation. In Cole, P. and Morgan, J. L., editors 1975, *Syntax and Semantics, Vol 3: Speech Acts.* Academic Press.) seem to enforce the second property: if the speaker believes that the hearer may draw an inappropriate default conclusion from her utterance, she is obliged to explicitly prevent it. This amounts to making sure that the appropriate contradiction will be in the hearer's "awareness set" (context) when the default is considered. Similarly, in many non-conversational applications of default reasoning, exceptions are perceptible, and hence can be expected to be in the current focus of attention if they occur. For example, when planning to take one's default (but flood-prone) route home, one can easily see whether it is raining heavily and, if so, block the default.

Finally, since by their very nature, defaults may be wrong despite being consistent with all one knows, systems in which default reasoning is being employed and the agents using such systems must in any case be prepared to deal with errors in default conclusions as the price of the efficiency gained from using them. That being the case, an increase in the error rate is less problematic than in monotonic reasoning.

Now observe that if we characterize a "good default" as one for which the probability that the prerequisite holds and the justification is inconsistent, combined with the probability that an inconsistency will not be noticed, is low, we are guaranteed that a context-based system will produce results as good as its defaults. If an application requires defaults for which ensuring high expected correctness requires an unmanageable context, the gains from our approach will be less significant.

4.7 EXAMPLES

The following canonical default reasoning example will provide an overview of one way in which our techniques may be employed:

$$\forall x. \; Canary(x) \supset Bird(x), \tag{2}$$

$$\forall x. \; Penguin(x) \supset Bird(x), \; \forall x. \; Penguin(x) \supset \neg Flies(x), \tag{3}$$

$$\forall x. \; Ostrich(x) \supset Bird(x), \; \forall x. \; Ostrich(x) \supset \neg Flies(x),$$

$$\forall x. \; Emu(x) \supset Bird(x), \; \forall x. \; Emu(x) \supset \neg Flies(x), \ldots$$

Canary(Tweety),

Penguin(Opus),

Emu(Edna), . . .

$$\frac{Bird(x):Flies(x)}{Flies(x)}$$

where the ellipses indicate axioms about many other kinds of birds and many other individual birds. In standard default logic, to conjecture that Tweety flies one must show that Flies(Tweety) is consistent with the above theory—that is, that one cannot prove Penguin(Tweety), Ostrich(Tweety), etc. This amounts to explicitly considering all the ways that Tweety might be exceptional, which seems directly opposed to the way people use defaults.

On the other hand, provided that recent history hasn't brought exceptional types of birds to mind, it is likely that our context would contain only Canary(Tweety) and (2). The sufficient test for consistency of Flies(Tweety) would then succeed, and so Flies(Tweety) could be assumed.

Considering whether Opus can fly, however, will bring Penguin(Opus) into the context and hence (3) (see section 4.5), resulting in the failure of the consistency test. Similarly, if one had been having a long discussion about various forms of flightless birds and then was asked whether Tweety could fly, one would expect information about exceptional classes of birds to still be in the context. The fast test would thus fail, and one would have to explicitly rule out those types of exceptions.

4.8 Pathological Examples

Conclusions reached using defaults are of course approximations, and as is the case with most approximation techniques, there are situations in which the approximation technique yields results that are too inaccurate. For instance, there are pathological theories in which any restriction of the context will falsely indicate consistency. For example:

$$\forall x\ Q(x) \lor P(1) \lor \ldots \lor P(n)$$

$$\neg P(1) \lor P(2) \lor P(3) \lor \ldots \lor P(n)$$

$$P(1) \lor \neg P(2) \lor P(3) \lor \ldots \lor P(n)$$

$$\neg P(1) \lor \ldots \lor \neg P(n)$$

$$\frac{:\neg Q(x)}{\neg Q(x)}\ .$$

If any axiom is excluded from the context, our approach will infer $\neg Q(i)$, for some i, although this is inconsistent with the theory.

There are two reasons why this theory is pathological: the default is universally inapplicable and there is no subset of the theory which indicates that the default is not applicable. We believe that in reality, theories to which default reasoning will be applied will be much less strongly-connected-not to mention much less frequently contradicted. It is clear, though, that our approach increases efficiency only with regard to theories for which there are in fact 'reasonable' defaults (as discussed in section 4.6 above).

4.9 Algorithms

In this section we outline algorithms which we have employed in a presently-preferred embodiment of the techniques. LISP code for the embodiment is in Appendix A.

These algorithms are intended only to show the practicality of the techniques, and the efficiency of the algorithms may be increased by applying a number of well-known methods. For example, the context selection algorithm (109) can be made more efficient by utilizing standard indexing techniques (or by using spreading activation). Also, more elaborate context-construction rules can be incorporated into the algorithm. Further, other fast consistency checkers from the literature could be added to algorithm 113 in a way similar to the two shown.

A preferred embodiment employs the following accessor functions on the knowledge-base [107]:
  get_facts(object, kb): Return set of ground facts in the knowledge-base kb about object.
  get_rules(Fed, kb): Returns set of rules from knowledge-base kb in which the predicate symbol pred appears in the consequent.

Contexts in the preferred embodiment are structures with the following fields:
  rels: Holds set of predicate symbols which appear in facts or rules in the context.
  non_horn_count: Holds count of non-horn rules in context.
  neg_facts_count: Holds count of non-negated facts in context.
  pos_facts_count: Holds count of non-negated facts in context.

Algorithm 109

```
Function build_context(kb [107], current_context [105],
default [103]):
    new_context := current_context;
    object := object appearing in justification of default;
    pred := predicate symbol appearing in justification of default;
    for each fact in get_facts(object)
        new_context := add_fact(fact,new_context);
    temp_context := new_context;
    for each rule in get_rules(pred)
        if some predicate symbol appearing in the antecedent
            of rule is in rels(new_context)
        then temp_context := add_rule(rule,temp_context);
    new_context := temp_context;
    return(new_context)
Function add_fact(fact,context):
    if fact negated
        then increment neg_facts_count(context)
        else increment pos_facts_count(context);
    add predicate symbol appearing in fact to rels(context);
    return(context)
Function add_rule(rule,context):
    unless rule is horn
        increment non_horn_count(context);
    add predicate symbol in consequent of rule to rels(context);
    add each predicate symbol appearing in the antecedent of
        rule to rels(context);
    return(context)
```

Algorithm 113:

```
Function fast_consistency_test(context [111], default [103]):
    test1(context,default) OR test2(context,default)
Function test1(context,default)
    /* Consistent if predicate symbol in justification does not
       appear in context
    */
    pred := predicate symbol appearing in justification of default;
    Return true if pred is not in rels(context)
Function test2(context,default)
    /* Horn rules only allow positive facts to be deduced from
       positive facts (and negative from negative).
    */
    (non_horn_count(context) =? 0)
    AND
    ((justification of default is negated AND (context_pos_facts
    (context) =? 0))
    OR
    (justification of default is not negated AND
    (context_neg_facts(context) =? 0)))
```

4.10 Worked Out Example

In the following, the algorithms of the foregoing section are applied to the object Tweety of the example in section 4.7. In this case the default (103) is:

$$\frac{\text{Bird(Tweety):Flies(Tweety)}}{\text{Flies(Tweety)}}$$

We assume that the current context (105) is initially empty, and that the knowledge-base (107) is as given in section 4.7:

$$\forall x\ Canary(x) \supset Bird(x), \tag{4}$$

$$\forall x\ Penguin(x) \supset Bird(x),\ \forall x\ Penguin(x) \supset \neg Flies(x), \tag{5}$$

$$\forall x\ Ostrich(x) \supset Bird(x),\ \forall x\ Ostrich(x) \supset \neg Flies(x),$$

$$\forall x\ Emu(x) \supset Bird(x),\ \forall x\ Emu(x) \supset \neg Flies(x), \ldots$$

Canary(Tweety),

Penguin(Opus),

Emu(Edna), . . .

$$\frac{\text{Bird}(x):\text{Flies}(x)}{\text{Flies}(x)}$$

We first build the context using algorithm 109. The object is just Tweety, and pred is Flies. We first collect up the facts about Tweety:

{Canary(Tweety)} get_rules(Flies) returns:

$\forall \{$ x. Penguin(x)$\supset \neg$Flies(x), $\forall$x. Ostrich(x)$\supset \neg$ Flies(x), $\forall$x. Emu(x)$\supset \neg$ Flies(x)$\}$ But none of the predicates in the antecedents of these rules appear in the context so we do not add any rules to the context. The new context (111) is thus just:

{Canary(Tweety)}

Now we apply fast consistency checks (113) to test the consistency of Flies(Tweety) with this context. Since Flies does not occur in the context, test1 immediately succeeds, and the default can be applied (117).

Now consider what happens if we attempt to apply the default rule that birds usually fly to Opus. The default, current context, and knowledge-base are as before. Again we build the context using algorithm 109. In this case we get one fact:

{Penguin(Opus)}

Further, get_rules(Flies) returns the same set of rules, but Penguin is now in the context so the rule:

$\forall$ x. Penguin(x)$\supset \neg$ Flies(x)

is added to the context. The new context (111) is thus:

{Penquin(Opus), $\forall$x. Penquin(x)$\supset \neg$Flies(x)}

Now we apply fact consistency checks (113) to test the consistency of Flies(Opus) with this context. However, in this case, Flies does occur in the context so the fast consistency tests fails, and the default cannot be applied.

5 Conclusion

In the foregoing, we have shown how techniques employing limited contexts and fast sufficient consistency checking may be used to increase the efficiency of reasoning systems and have shown those of ordinary skill in the art how to make and use a default reasoner which employs limited contexts and fast sufficient consistency checking.

As pointed out in the foregoing discussion, use of the techniques disclosed herein is not limited to default reasoning, but may be employed in any situation in which an approximation reached by applying a fast sufficient consistency check to a limited context is useful. As further pointed out, the disclosed embodiment, while being the best presently known to the inventors, is intended only to show the practicality of the techniques. In other embodiments, different algorithms may be employed to determine a context and to perform the fast consistency check. That being the case, the Detailed Description is to be understood as being in all respects illustrative and exemplary, but not restrictive, and the scope of the invention disclosed herein is to be determined solely from the claims as interpreted in light of the doctrine of equivalents.

Appendix A

Interface to KB:
-----------------

Functions provided:

consistent-p(pred):
Constructs context for pred and tests consistency.
Returns t if some fast consistency check succeeds.

Functions required:

default-get-facts(object):
Should return list of ground facts about object.

default-get-rules(pred):
Should return list of rules in which pred appears positively in the consequent.

default-get-nrules(pred):
Should return list of rules in which pred appears negatively in the consequent.

LISP Code:
----------

```lisp
(defparameter *trace-context* t)
(defvar *current-context* nil)
(defvar *all-contexts* nil "List of all known contexts")

(defstruct context
  name              ; Symbol which names context.
  ;facts            ; List of non-negated facts in context. -- not yet used.
  ;neg-facts        ; List of negated facts in context. -- not yet used.
  ;rules            ; List of rules in context. -- not yet used.
  rels              ; List of relations which appear in facts or rules.
                    ; Should become hash table, and should count number
                    ; of occurances of each rel.

(non-horn-count 0)   ; Holds count of non-horn rules in context.
  (neg-facts-count 0)  ; Holds count of non-negated facts in context.
  (pos-facts-count 0)  ; Holds count of non-negated facts in context.

;; Accessors:  All of these should be funcall'able:
  (antecedent 'default-antecedent)
                    ; Returns list of predicates which are antecedent of rule.
  (consequent 'default-consequent)
                    ; Returns predicate which is consequent of rule.
  (relation 'default-relation)
                    ; Returns relation in predicate (facts are considered predicates).
  (negatedp 'default-negatedp)
                    ; Returns p if predicate is negated.
)

;;; New-Context: Starts a new context and makes it current.
;;;
(defmacro new-context (&whole macro-call
      name &key antecedent consequent relation)
  (declare (ignore antecedent consequent relation))
  `(let ((mname ,name))
     (if (find mname *all-contexts* :key #'context-name)
  (error "Context with name ~(~a~) exists." mname))
     (when *trace-context*
  (format t "~%Starting new context: ~(~a~)." mname))
     (push (make-context :name mname ,@(cddr `(quote ,macro-call)))
  *all-contexts*)
     (current-context mname)))

(defun CONSISTENT-P (pred)
  (reset-contexts)
  (new-context pred)
  ;; Add the facts about the individual in pred:
  (dolist (fact (default-get-facts (default-frame pred)))
  (add-fact fact))
  ;; Add rules if a predicate in their consequent is in the context:
  (dolist (rule (if (default-negatedp pred)
                    (default-get-rules (default-negate pred))
                    (default-get-nrules (default-negate pred))))
    (if (some #'(lambda (pred) (find (default-relation pred)
                                    (context-rels *current-context*)))
          (default-antecedent rule))
      (add-rule rule)))
```

```
;; check consistency
 (show-context)
 (format t "~% Checking consistency of ~a" pred)
 (default-consistent pred))

(defun show-context (&optional (context *current-context*))
  (format t
          "~%~% Context ~(~a~): ~% non-horn = ~a neg-facts = ~a pos-facts = ~a ~% rels: ~a~%"
    (context-name context)
    (context-non-horn-count context)
    (context-neg-facts-count context)
    (context-pos-facts-count context)
    (remove-duplicates (context-rels context))))

(defun default-antecedent (rule)
  (let (tail)
    (cond ((setq tail (member '<- rule :test #'eq))
     (cdr tail))
    ((setq tail (member '-> rule :test #'eq))
           (context-copy-list-to rule '->))
    (t
     (error (format nil
                    "Illegal rule syntax --- No implication (-> or <-) in rule ~(~a~) .
                    rule))))))

;;; This routine assumes that the consequent is a single predicate.
(defun default-consequent (rule)
  (let (tail)
    (cond ((setq tail (member '-> rule :test #'eq))
     (second tail))
    ((setq tail (member '<- rule :test #'eq))
     (first rule))
    (t
     (error (format nil
                    "Illegal rule syntax --- No implication (-> or <-) in rule ~(~a~) .
                    rule))))))

(defun default-relation (pred)
  (if (eql (first pred) 'not)
      (first (second pred))
    (first pred)))

(defun default-frame (pred)
  (if (eql (first pred) 'not)
      (second (second pred))
    (second pred)))

(defun default-negatedp (pred)
  (eql (first pred) 'not))

(defun default-negate (pred)
  (if (eql (first pred) 'not)
      (second pred)
    '(not ,pred)))

(defun context-copy-list-to (list end-flag)
  (if (eq (car list) end-flag)
```

```
           nil
     (cons (car list) (context-copy-list-to (cdr list) end-flag))))
#|
Notes 1. Relations should be symbols.

2. The default accessors will work if rules are list of predicates
containing -> and <- for implication, and predicates are lists of
form (rel arg1 ... argn) or (not (rel arg1 ... argn)).

|#

;;; Current-context: Switch to another known context:
;;;
(defun current-context (name)
  (setq *current-context*
(find name *all-contexts* :key #''context-name)))

;;; Add-Rule: Add a rule to the current context:
;;;
(defun add-rule (rule)
  ;; (push rule (context-rules *current-context*))
  (when *trace-context*
(format t "~% Adding rule ~(~a~) to current context." rule))
  (unless (hornp rule)
   (incf (context-non-horn-count *current-context*)))
  (default-add-pred (get-conseq rule))
  (dolist (pred (get-ant rule))
   (default-add-pred pred)))

;;; Add-Fact: Add a fact to the current context:
;;;
(defun add-fact (fact)
  (when *trace-context*
(format t "~% Adding fact ~(~a~) to current context." fact))
  (cond ((get-negatedp fact)
   ;;    (push fact (context-neg-facts *current-context*))
   (incf (context-neg-facts-count *current-context*)))
  (t ; non-negated
   ;;    (push fact (context-facts *current-context*))
   (incf (context-pos-facts-count *current-context*))))
  (default-add-pred fact))

(defun default-consistent (fact)
  (let ((consistent
  (or
   (and (= (context-non-horn-count *current-context*) 0)
        ;; Horn clauses only allow positive from positive and
        ;; negative from negative:
        (or (and (get-negatedp fact)
 (= (context-pos-facts-count *current-context*) 0))
   (and (not (get-negatedp fact))
 (= (context-neg-facts-count *current-context*) 0))))

;; If relation in fact never appears in context then consistent:
   (not (find (get-rel fact) (context-rels *current-context*) :test #''eq)))))
     (when *trace-context*
```

```
(if consistent
    (format t "~% ~(~a~) is consistent with current context." fact)
    (format t "~% ~(~a~) may NOT be consistent with current context." fact)))
  consistent))

(defun reset-contexts ()
  (if *trace-context* (format t "Resetting all contexts."))
  (setq *all-contexts* nil))

;;; Utility routines:

(defun default-add-pred (pred)
  (push (get-rel pred) (context-rels *current-context*)))
(defun hornp (rule)
  (or
   ;; p <- a1 ... an and no ai are negated
   (and (non-negated-p (get-conseq rule))
(every #'non-negated-p
       (get-ant rule)))
   ;; (not p) <- a1 ... an and exactly one ai is negated
   (and (get-negatedp (get-conseq rule))
(= (count-pred 'get-negatedp (get-ant rule)) 1))))

(defun count-pred (pred list)
  (if (consp list)
      (if (funcall pred (car list))
  (+ 1 (count-pred pred (cdr list)))
(count-pred pred (cdr list)))
      0))

(defun non-negated-p (pred)
  (not (get-negatedp pred)))

(defun get-ant (rule)
  (funcall (context-antecedent *current-context*) rule))
(defun get-conseq (rule)
  (funcall (context-consequent *current-context*) rule))
(defun get-rel (pred)
  (funcall (context-relation *current-context*) pred))
(defun get-negatedp (pred)
  (funcall (context-negatedp *current-context*) pred))
```

What is claimed is:

1. A method employed in a reasoning system implemented using a computer system, the reasoning system including a knowledge base of formulae which is accessible to the computer system and the method serving to approximately determine for the reasoning system whether a given fact about one or more objects is consistent with the knowledge base, the method comprising the steps of:
   obtaining a context made up of a subset of the formulae from the knowledge base;
   determining a consistency relationship between the given fact and the context using a test whose success implies consistency but whose failure does not necessarily provide any information; and
   indicating to the reasoning system that the given fact is consistent with the knowledge base if the test succeeds.

2. The method set forth in claim 1 wherein:
   the step of determining the consistency relationship is performed by testing whether any predicate occurring in a clausal form of the given fact also occurs with opposite sign in a clausal representation of the context.

3. The method set forth in claim 1 wherein:
   the step of determining the consistency relationship is performed by testing whether clausal representations of the context and the fact are both definite.

4. The method set forth in claim 1 wherein:
   the step of determining the consistency relationship is performed by testing whether all formulae in the context are Horn, all ground literals in the context are positive, and the given fact is a positive literal.

5. The method set forth in claim 1 wherein:
   the step of determining the consistency relationship is performed by testing whether all formulae in the context are Horn, all ground literals in the context are negative, and the given fact is a negative literal.

6. The method set forth in claim 1 wherein:
the step of determining the consistency relationship is performed by testing whether the negation of the given fact is implied by a logical upper bound of the context for which implication is efficiently determinable.

7. The method set forth in claim 1 wherein:
the step of obtaining the context is performed by selecting the subset based on recent reasoning and perceptual history of an agent who is employing the reasoning system.

8. The method set forth in any of claims 1, 2, 3, 4, 5, 6, or 7 wherein:
the step of obtaining the context includes the steps of:
collecting facts in the knowledge base that are about the objects in the given fact; and
maintaining a subset of rules in the knowledge base such that the subset contains any rule whose antecedent and consequent are instantiated in either the context or a negation of the given fact.

9. The method set forth in claim 1 wherein:
the knowledge base further contains a default rule and implies a prerequisite of the default rule;
the given fact is a justification of the default rule; and
the method further comprises the step of treating the consequent of the default as true whenever the given fact is treated as consistent.

10. The method set forth in any of claims 1, 7, or 9 further including the steps performed when the test does not succeed of:
determining the consistency relationship of the given fact with the context by means of a test which always indicates the consistency relationship of the given fact with the context; and
indicating to the reasoning system that the given fact is consistent if the test which always indicates the consistency relationship so indicates.

11. Apparatus employed in a reasoning system implemented using a computer system, the reasoning system including a knowledge base of formulae which is accessible to the computer system and the apparatus serving to approximately determine for the reasoning system whether a given fact about one or more objects is consistent with the knowledge base, the apparatus comprising:
means for obtaining a context made up of a subset of the formulae from the knowledge base; and
first testing means responsive to the given fact and the context for determining a consistency relationship between the given fact and the context by means of a first test whose success implies consistency between the given fact and the context but whose failure does not necessarily provide any information and returning a first indication when the first test succeeds which indicates to the reasoning system that the given fact is consistent with the knowledge base.

12. The apparatus set forth in claim 11 wherein:
the first testing means determines whether any predicate occurring in a clausal form of the given fact also occurs with opposite sign in a clausal representation of the context.

13. The apparatus set forth in claim 11 wherein:
the first testing means determines whether clausal representations of the context and the fact are both definite.

14. The apparatus set forth in claim 11 wherein:
the first testing means determines whether all formulae in the context are Horn, all ground literals in the context are positive, and the given fact is a positive literal.

15. The apparatus set forth in claim 11 wherein:
the first testing means determines whether all formulae in the context are Horn, all ground literals in the context are negative, and the given fact is a negative literal.

16. The apparatus set forth in claim 11 wherein:
the first testing means determines whether the negation of the given fact is implied by a logical upper bound of the context for which implication is efficiently determinable.

17. The apparatus set forth in claim 11 wherein:
the means for obtaining the context selects the subset based on the recent reasoning and perceptual history of an agent who is employing the reasoning system to reason about the object.

18. The apparatus set forth in any of claims 11, 12, 13, 14, 15, 16, or 17 wherein:
the means for obtaining the context collects those facts in the knowledge base that are about the objects in the given facts and maintains a subset of the rules such that the subset contains any role whose antecedent and consequent are instantiated in either the context or a negation of the given fact.

19. The apparatus set forth in claim 11 wherein:
the knowledge base further contains a default rule and implies a prerequisite of the default rule;
the given fact is a justification of the default rule; and
the means for responding to the first indication treats the consequent of the default as true whenever the given fact is treated as consistent.

20. The apparatus set forth in any of claims 11, 17, or 19 further comprising:
second testing means responsive to the given fact and the context for operating when the first testing means does not succeed for determining the consistency relationship of the given fact with the context by means of a test which always indicates the consistency relationship of the given fact with the context and returning a second indication to the reasoning system when the second consistency test indicates consistency.

* * * * *